Patented Oct. 31, 1950

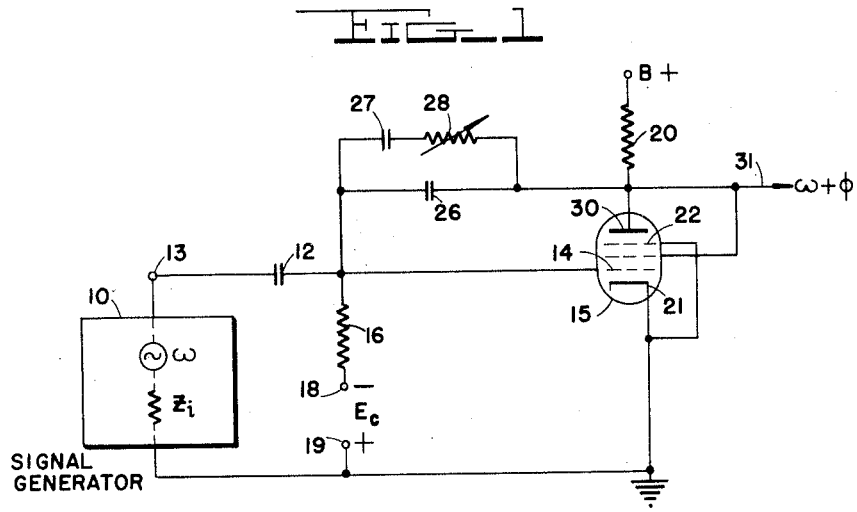
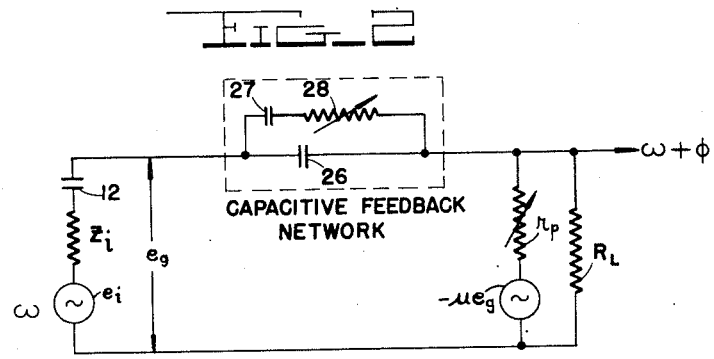
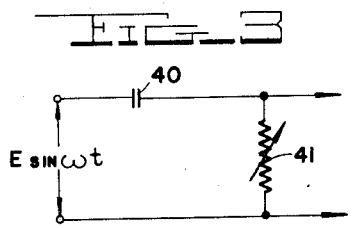

2,527,535

UNITED STATES PATENT OFFICE 2,527,535

ELECTRONIC PHASE SHIFTER

Robert A. Emmett, Jr., United States Navy

Application December 14, 1945, Serial No. 635,127

2 Claims. (Cl. 178—44)

(Granted under the act of March 3, 1883, as amended April 30, 1928; 370 O. G. 757)

This invention relates in general to the art of electrical phase shifting and, more particularly, to a novel electronic circuit capable of causing a phase shift in a given sinusoidal voltage, the amount of phase shift being determined by a direct current control voltage.

One object of this invention is to provide a novel method and means for shifting the phase of an alternating voltage electronically.

Another object of this invention is the provision of an electronic circuit that will allow essentially linear control of phase shift from a direct current voltage.

A further object of the invention is to present a circuit capable of shifting the phase of a voltage over wide ranges, unobtainable by ordinary means.

Other and further objects and features of this invention will be apparent from the following specification and drawings, showing only an exemplary embodiment of the invention, in which:

Fig. I is a schematic diagram of the phase shifting circuit of the invention including a low impedance source of sinusoidal voltage;

Fig. II is an equivalent diagram of the schematic circuit shown in Fig. I; and

Fig. III is a simplified version of the equivalent circuit of Fig. II illustrating a principal of phase shifting.

Referring now to Fig. I, the signal generator 10, is represented as a source of frequency of angular velocity $\omega$ and low internal impedance $Z_i$. Coupling condenser 12 passes the input signal, applied at terminal 13, to the grid control 14 of vacuum tube 15, and also serves as part of the phase shifting system, as will be apparent from the subsequent description. The grid resistor 16, of high value, is connected from the grid 14 of the vacuum tube 15 through a source of bias $E_c$, applied at terminals 18 and 19, to ground. This bias voltage may be either a steady direct current voltage or a varying voltage, depending on the nature of phase shift desired. The tube 15 obtains its plate and screen grid voltages through load resistor 20. The cathode 21 and suppressor grid 22 are both grounded, as shown. It would be equally feasible to ground the grid resistor 16 and introduce the bias voltage in the cathode circuit instead. Feedback condenser 26 and the combination of condenser 27 and variable resistor 28 connected as a corrective network shunting condenser 26, comprise a capacitive-resistive feedback network. Condenser 26 is connected from the plate 30 to the control grid 14 and is shunted by series-connected condenser 27 and resistor 28. The output frequency, shifted in phase by an amount $\phi$, is taken off at the plate 30 via lead 31.

The equivalent circuit diagram of Fig. II illustrates the principles of operation of the Fig. I circuit arrangement. At the left, the generator impedance $Z_i$, the coupling condenser 12, and the E. M. F. of angular velocity $\omega$ comprise the input circuit. The capacitive feedback network then follows in series. Lastly, the equivalent circuit of the tube 15 shunted by its load resistance 20 comprises the output circuit and completes the series loop. As shown in Fig. II, the tube 15 is replaced by a plate resistance $r_p$ and an equivalent E. M. F. $-\mu e_g$. The grid resistor 16 of Fig. I is not included since it is of a much higher impedance than the input circuit described above and therefore has very little shunting effect. The phase shift $\phi$ to be obtained can be accomplished in several ways: (1) by varying any of the linear circuit parameters, (2) by varying the frequency, or (3) by changing either the plate voltage or the value of the bias, thus effecting the transconductance of the vacuum tube. The last-indicated method is selected, in the present instance, since it makes possible smooth, automatic control with no movable parts. Therefore, if $E_c$ is the grid bias voltage capable of being varied, and $g_m$ is the tube transconductance, then the following relationship exists:

$$g_m = f(E_c)$$

Also, $$g_m = \frac{\mu}{r_p}$$

where $r_p$ is the plate resistance and $\mu$ is the amplification factor of the tube.

Then, $$\mu = f'(E_c)$$

and $$r_p = f''\left(\frac{1}{E_c}\right)$$

which is substantiated from the tube characteristics of any pentode. Thus, it can be seen that varying the grid bias will vary both the plate resistance $r_p$, which is in shunt with the rest of the circuit, and the amplification factor $\mu$, although for most tubes, the amplification factor is almost constant over a considerable range. Since $g_m$ is non-linear with respect to $E_c$ it is necessary to devise a circuit which will have reciprocal characteristics and thus compensate for the non-linearity. To accomplish this, condenser 27 and variable resistor 28 were added and adjusted experimentally for a linear phase shift with bias voltage for the given tube in use. High $g_m$, sharp cut-off pentodes connected as pentodes tend to give a greater amount of phase shift for a given change in grid bias than semi-remote and remote cut-off pentodes connected as triodes.

Fig. III is a simplified version of the equivalent circuit diagram shown in Fig. II. The loop circuit capacity is lumped into one condenser 40 and the paralleled load and plate resistance are combined into one variable resistor 41. This diagram, however, does not take into account the 180 degrees phase shift in the vacuum tube 15 nor the phase shift at the grid produced by the voltage dividing action of condensers 12 and 26, but it does serve to illustrate how the transconductance of the tube controlling the plate resistance is able to produce a change of phase.

If a constant input voltage $E \sin \omega t$ were impressed across the circuit as shown in Fig. III, the current through the circuit, and hence the voltage across the resistor 41, would vary with each value of resistance. If the voltage across the resistor 41 were small, the voltage across the condenser 40 would have to be large to make up the vector total, $E \sin \omega t$ and the phase of the voltage across the resistor 41 would be of some angle with respect to the total. Any change in resistor voltage would cause a corresponding change in phase relationship, in order that the vector sum of the voltage be maintained.

Carrying this analogy to the arrangement of Fig. I it will be seen that if the bias voltage were made large enough to cut the tube 15 off, the transconductance would be reduced to zero and the input signal voltage would simply be coupled through the coupling condenser 12 and the capacitative feedback condenser 26 to the output circuit. This would result in approximately zero phase shift. If however the bias voltage were slowly lowered, so as to increase the transconductance of tube 15, a finite value of resistance would be placed in series with the condensers 12 and 26 and an appreciable amount of voltage dividing would occur, resulting in a phase shift. From this it is seen that it is desirable to make the value of load resistor 20 as large as possible if the phase $\phi$ is to be made small. On the other hand, if the transconductance of the tube were made very high so as to reduce the plate resistance to a negligible value, it would appear that the phase shift would reach its maximum value of 90°. This however is not the case. The inherent 180° phase shift of a vacuum tube is one element that produces modifying effects on the circuit. It would be seen, for example, that if the circuit could be made to allow the signal input voltage to arrive at the plate by two independent paths consisting of the direct route to condensers 12 and 26, and electronically through condenser 12 and tube 15, and both be of the same magnitude upon reaching the plate, they would be 180° out of phase and cancel each other. This does not occur, however, since the feedback voltage applied through condenser 26 to the grid of the vacuum tube has an appreciable phase shift, as a rule, and therefore produces an output at the plate. This effect, however, is felt when the total phase shift is small at which time the amplification of the tube is very low and most of the signal voltage is being passed through the condensers 12 and 26 directly.

For the embodiment shown in Fig. 1, using a 6SG7 tube, condensers 12 and 26 of values 0.005 microfarad, condenser 27 equal to 0.05 microfarad and resistor 28 variable up to 200,000 ohms, phase shifts up to 150°, essentially linear with grid bias were obtained. Total phase shift of 230° with a 30 volt change in grid bias were experienced with some sacrifice in linearity.

While there has been described above a preferred embodiment of the invention, it should be understood that other adaptations thereof may be constructed without the departure from the spirit of the invention as defined in the appended claims.

The invention described herein may be manufactured and used by or for the Government of the United States of America for governmental purposes without the payment of any royalties thereon or therefor.

What is claimed is:

1. An electronic phase shifting circuit comprising, a thermionic vacuum tube having at least a control grid, a cathode, and an anode, an input terminal for receiving an alternating voltage to be shifted in phase, an output terminal connected to said anode, condenser means for coupling said input terminal to said control grid, resistance means coupling a control voltage to said control grid, a capacitive feedback path connecting said anode to said control grid operative to produce a linear relation between the plate resistance of said tube and said control voltage over an extended range of control voltage variation.

2. An electronic phase shifting circuit comprising, a thermionic vacuum tube having at least a control grid, a cathode, and an anode, an input terminal for receiving an alternating voltage to be shifted in phase, an output terminal connected to said anode, condenser means for coupling said input terminal to said control grid, resistance means coupling a control voltage to said control grid, a feedback path from said anode to said grid comprising a condenser in parallel with a resistance and a condenser in series, said feedback path being operative to produce a linear relation between the plate resistance of said tube and said control voltage over an extended range of control voltage variation.

ROBERT A. EMMETT, Jr.

REFERENCES CITED

The following references are of record in the file of this patent:

UNITED STATES PATENTS

| Number | Name | Date |
|---|---|---|
| 2,088,439 | Rothe | July 27, 1937 |
| 2,102,671 | Black | Dec. 21, 1937 |
| 2,131,393 | Stillwell | Sept. 27, 1938 |
| 2,254,243 | Ripley | Sept. 2, 1941 |
| 2,312,982 | Stenning | Mar. 2, 1943 |
| 2,321,269 | Artzt | June 8, 1943 |
| 2,382,436 | Marble | Aug. 14, 1945 |

OTHER REFERENCES

Radio Engineering, by F. E. Terman, 2nd ed., McGraw-Hill, 1937, pages 122–126.